(No Model.)　　　G. WESTINGHOUSE, Jr.　　2 Sheets—Sheet 1.
AIR BRAKE PRESSURE REGULATOR.

No. 270,528.　　　　　　　　Patented Jan. 9, 1883.

Witnesses　　　　　　Inventor George Westinghouse Jr.
　　　　　　　　　　　by Attÿ. George H. Christy (No Model.) 2 Sheets—Sheet 2.
G. WESTINGHOUSE, Jr.
AIR BRAKE PRESSURE REGULATOR.
No. 270,528. Patented Jan. 9, 1883.
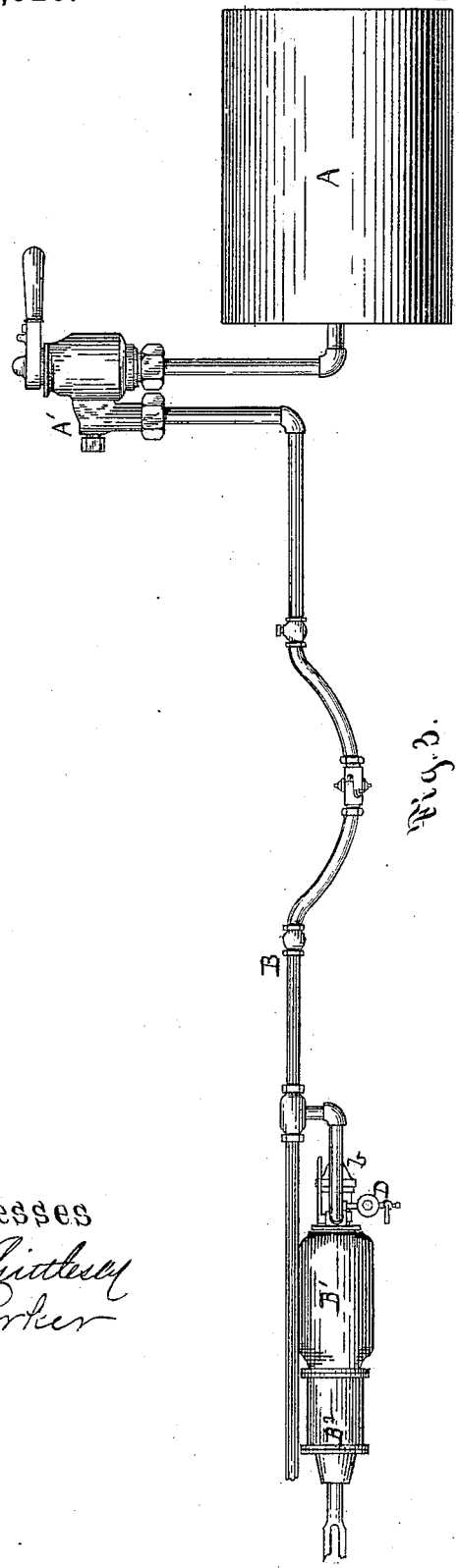

UNITED STATES PATENT OFFICE.

GEORGE WESTINGHOUSE, JR., OF PITTSBURG, PENNSYLVANIA.

AIR-BRAKE PRESSURE-REGULATOR.

SPECIFICATION forming part of Letters Patent No. 270,528, dated January 9, 1883.

Application filed November 23, 1882. (No model.)

*To all whom it may concern:*

Be it known that I, GEORGE WESTINGHOUSE, Jr., of Pittsburg, county of Allegheny, State of Pennsylvania, have invented or discovered a new and useful Improvement in Air-Brake Pressure-Regulators; and I do hereby declare the following to be a full, clear, concise, and exact description thereof, reference being had to the accompanying drawings, making a part of this specification, in which—like letters indicating like parts—

Figure 1:
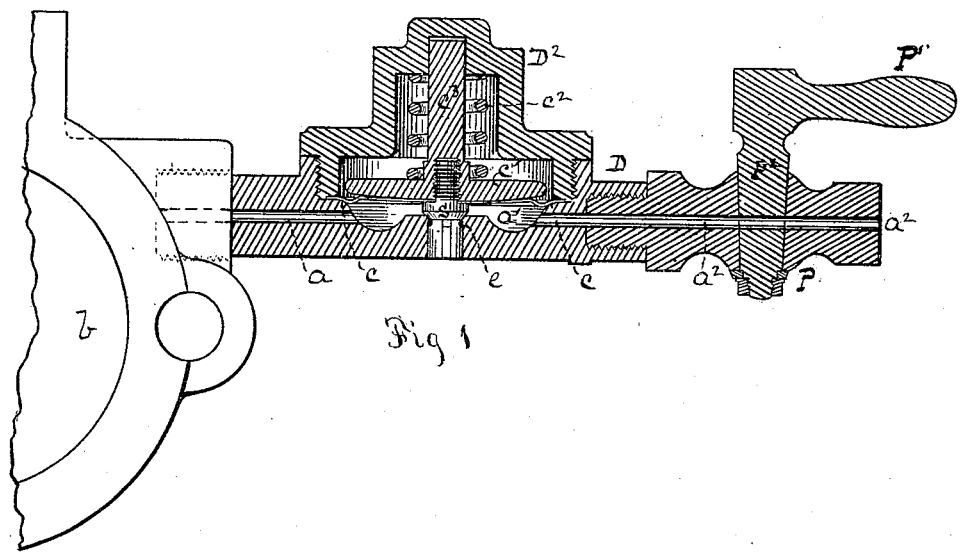
Figure 2:
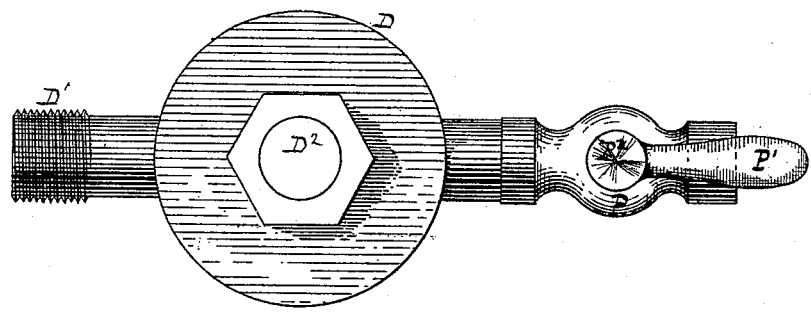

Figure 1, Sheet 1, is a sectional view of my improved regulator as attached to the air-escape port of a triple valve. Fig. 2 is a top or plan view of the regulator; and Fig. 3, Sheet 2, illustrates the manner of incorporating the same into an automatic fluid-pressure brake mechanism.

My present improvement is particularly designed as an attachment to the ordinary Westinghouse automatic air-brake, though applicable to automatic pressure-brakes generally. In such apparatus, as is well known, an air-pump is employed to compress air into the main reservoir, usually arranged on the locomotive. From this a line of pipe, with flexible hose and couplings between cars, extends back under the train, and under each car is conducted by suitable connections centering in a valve, commonly called a "triple valve," with an air-reservoir and brake-cylinder. An operating-cock, in any convenient position to be manipulated by the engineer, is added, and the whole apparatus is of such construction that, when the cock is open for the back flow of compressed air from the main reservoir, proper ports are open for the storage of such air in the auxiliary reservoirs under the cars and for the escape from the several brake-cylinders of the compressed air previously employed therein. Then, when the engineer desires to apply the brakes, he allows a little air to escape from the train-pipe, with the result of closing the escape-port, which leads from each brake-cylinder to the open air, and also to open a port from each auxiliary reservoir to its own brake-cylinder, so as by the admission of air under pressure into the latter to apply the brakes. In using brake apparatus of this class down steep grades it is sometimes important to keep the brakes on till the foot of the grade is reached. To do this down very long grades is difficult in case the brake apparatus is not in the best of order, since the wearing of the brake-shoes, the springing of the brake levers and connections, and the waste of the compressed air by leakage are liable to result in the loosening of the brake-shoes, or in such a slackening of their bite or grip that it becomes necessary to recharge the auxiliary reservoirs with a new store or supply of compressed air. With long trains this takes an appreciable length of time, during which the brakes will be off, and the train will be moving with an accelerated, and perhaps dangerous, speed.

My present invention relates more particularly to an attachment by which the entire escape of compressed air from the supply of several brake-cylinders may be prevented or only a portion of the brake-pressure be exhausted, when so desired, so that while recharging the several auxiliary reservoirs of the train the brakes cannot be entirely released, and the residuum of brake-pressure in the brake-cylinder may be sufficient in amount to prevent the train from passing so far out of control of the engineer as to be a serious source of difficulty or danger.

In the drawings, Fig. 3, I have represented the main reservoir at A, and operating-cock at A', and auxiliary reservoir (one on each car) at B', the brake-cylinder at B², and the triple valve referred to at $b$. These devices may be constructed and arranged as described in Patent No. 243,415, granted to me June 28, 1881, or in other suitable known way. Into the air-escape port of this triple valve I screw or otherwise attach the device D, more fully represented in Figs. 1 and 2, where D' indicates the screw-thread for making such connection, and $a$ is a port leading longitudinally through it to chamber $a'$ beneath the flexible diaphragm $c$, which latter is supported at its middle by a suitable disk, $c'$, and is held down by the spring $c^2$ on the stem $c^3$, and such spring is compressed to any desired degree of resiliency by the cap-piece D², which latter also clamps the flexible diaphragm $c$ around its outer edge, and so secures it in place.

Beneath the center of the diaphragm $c$ is a port, $e$, leading to the open air, and this port is opened and closed with the varying position of the diaphragm by means of the valve $s$, secured to the under side of the diaphragm, or to the disk $c'$, and which is constructed and arranged to move to and from a seat in the adjacent end of the port $e$, and is properly guided by a winged stem, which enters the port, or otherwise.

From the chamber $a'$ port $a^2$ leads to the open air; but in the line of its passage I arrange an air-valve key or cock, P, with such an arrangement of ports that the port $a^2$ may be closed by setting the cock P to one position, or may be opened to the open air by setting to another position, as may be desired. This cock is operated by any suitable handle, P'.

Assume, now, that a train, each car of which is furnished with the apparatus described, is about to descend a long, steep grade. The cocks P on all the cars are to be closed, and as the train starts down the grade the brakes are to be set in the usual way. Then when, from leakage or other cause, the brake-shoes fail to hold as required, the engineer shifts his cock A', so as to recharge the auxiliary reservoirs with a new supply of compressed air. In the absence of the device D the air-pressure would escape freely from the brake-cylinders and the brakes would be entirely released; but with the device D, assuming the power of the spring $c^2$ to be such as will resist an air-pressure of twenty-five pounds per square inch, it will be seen that the air escaping from the cylinders $B^2$, (the cock P being closed,) in order to escape at all, must act on the lower side of the diaphragm $c$, so as to lift valve $s$ clear of its seat in the port $e$. Hence, under the conditions supposed, the air-pressure will escape from the brake-cylinders until it is reduced down to the pressure of twenty pounds per square inch, and then its force will be counterbalanced by the pressure-spring $c^2$ as against any further reduction of air-pressure in the brake-cylinders, the valve $s$ will be seated by the action of the spring, and further escape of air-pressure from the brake-cylinders will be prevented. Hence the brake-power of twenty pounds per square inch will remain in the brake-cylinders, and to the extent of such pressure will continue to be and remain operative in holding the brakes to the wheels.

The spring $c^2$ may be made more or less rigid, as desired, or may be arranged with means of adjustment, so that its resiliency may be varied for varying steepness of grades; but whatever its power, it will have the effect described, so that by regulating its power a sufficient amount of brake-power can be kept in the auxiliary reservoirs to enable the engineer to keep his train under control while recharging the auxiliary reservoirs preliminary to a new application or setting of the brakes with a power greater, if desired, than that which the springs still retain. When the foot of the grade is reached the cocks P are to be opened, and, in fact, when the train is running on the ordinary track, or over low grades, or on an upgrade, the key $P^2$ will ordinarily be set in an open position, so that the air may escape freely from the brake-cylinders when the brakes are released or when the reservoirs are to be recharged; but when about to run down a steep grade the cock P should be closed, and then a portion of the air-pressure will be preserved in the brake-cylinders, and such pressure will correspond to the power of the spring $c^2$. Hence, in the construction of the apparatus the spring $c^2$ should be selected and used of a degree of resiliency to the pressure which it is desired should be retained in the brake-cylinders while the work of recharging the reservoirs is going on.

Any suitable form or construction of pressure-regulator operating in substantially the manner described may be substituted for that shown as an element in the invention set forth. For example, a spring-valve of suitable form and construction, opening and closing the escape-port of a fluid-pressure brake-cylinder and opened by an excess of pressure, may be combined with a separate cock, so that by the setting of the latter one way a free escape may be provided, or by the setting of the cock the other way the air may be caused to escape only by lifting or unseating the spring-valve.

In the device D the port $a^2$ may be closed and the cock P be arranged in the line of a port branching from $a$ with like operation and effect. Such and other similar modifications of my invention are hereby expressly included herein; also, any suitable device for opening and closing the escape-port $a^2$ may be substituted for the cock P as the mechanical equivalent thereof, and under the term "cock P," I include such equivalents.

I claim herein as my invention—

1. A pressure-regulator having a cock, P, in combination with a brake-cylinder, substantially as set forth.

2. In combination with an auxiliary brake-cylinder, a spring diaphragm and valve or equivalent spring-valve, having air-ports leading, one to the air-escape port of the brake-cylinder, one to the open air when the diaphragm is raised or the spring-valve is unseated, and the third opening through a cock, P, to the open air, substantially as set forth.

3. The combination, in an automatic fluid-pressure brake apparatus, of a brake-cylinder, a triple valve, and a pressure-regulator connected to the air-escape port leading from the brake-cylinder through the triple valve, substantially as set forth.

4. A brake pressure-regulator having in combination a spring-diaphragm, $a$, $a^2$, and $e$, and cock P, substantially as set forth.

In testimony whereof I have hereunto set my hand.

GEORGE WESTINGHOUSE, JR.

Witnesses:
　GEORGE H. CHRISTY,
　R. H. WHITTLESEY.